United States Patent [19]

Butterfield

[11] Patent Number: 5,027,870
[45] Date of Patent: Jul. 2, 1991

[54] OVERFILL PREVENTION MECHANISM FOR STORAGE TANKS

[75] Inventor: Eric J. Butterfield, Cary, N.C.

[73] Assignee: Emco Wheaton, Inc., Cary, N.C.

[21] Appl. No.: 517,201

[22] Filed: May 1, 1990

[51] Int. Cl.⁵ .................... F16K 21/18; F16K 31/18
[52] U.S. Cl. .................................. 141/198; 137/423;
137/409; 141/212; 141/216; 141/220; 141/229
[58] Field of Search ............... 141/198, 199, 200, 212,
141/213, 216, 218, 220, 221, 222, 223, 224, 228,
229; 137/429, 409, 411, 423, 427

[56] References Cited

U.S. PATENT DOCUMENTS

| | | |
|---|---|---|
| 320,716 | 6/1885 | Stadler . |
| 500,453 | 6/1893 | Wright . |
| 1,289,490 | 12/1918 | Lundstrom . |
| 1,462,253 | 7/1923 | Tobiasson . |
| 1,689,066 | 10/1928 | Baxter . |
| 2,569,110 | 9/1951 | McGillis et al. . |
| 3,078,867 | 2/1963 | McGillis et al. . |
| 3,732,902 | 5/1973 | Muller ............................... 141/198 |
| 3,963,041 | 6/1976 | McGillis . |
| 4,098,307 | 7/1978 | Taylor . |
| 4,667,711 | 5/1987 | Draft . |
| 4,770,317 | 9/1988 | Podgers et al. . |

FOREIGN PATENT DOCUMENTS 88309524.2 10/1988 European Pat. Off. .
8100326 8/1982 Netherlands ................... 141/198

OTHER PUBLICATIONS

OPW Technical Bulletin, "61-SO Overfill Prevention Valve," particularly p. 2, QA 11 (May 27, 1988).
OPW Technical Flyer 61-SO, "Overfill Prevention Valve" (Apr., 1989).
OPW Publication OPW-SOP, "The System Solution to your UST Needs," particularly p. 2 (Oct., 1988).
OPW Publication C-3557-PA, "Assembly and Installation Instructions for OPW 61-SO Overfill Prevention Valve," (Feb., 1988).
OPW Catalog SSE, "Service Station Equipment," particularly p. 19 (Apr., 1988).

Primary Examiner—Ernest G. Cusick
Attorney, Agent, or Firm—Bell, Seltzer, Park & Gibson

[57] ABSTRACT

A float chamber located in generally parallel, laterally spaced relationship to the main liquid flow passageway contains superimposed floats that move along a substantially linear path of travel. The floats cooperate with other control components to effect closure of a main valve assembly when the liquid level adjacent the mechanism reaches a preselected first elevation, and to close a bleed valve assembly when the liquid level reaches a second, higher elevation. The main valve assembly includes a movable plate valve that is spring biased toward an open position and that is biased toward a closed position by the force of liquid adjacent thereto and upstream therefrom. A latch and associated catch prevent movement of the valve plate to its closed position until such time as the liquid level reaches the first elevation.

16 Claims, 5 Drawing Sheets

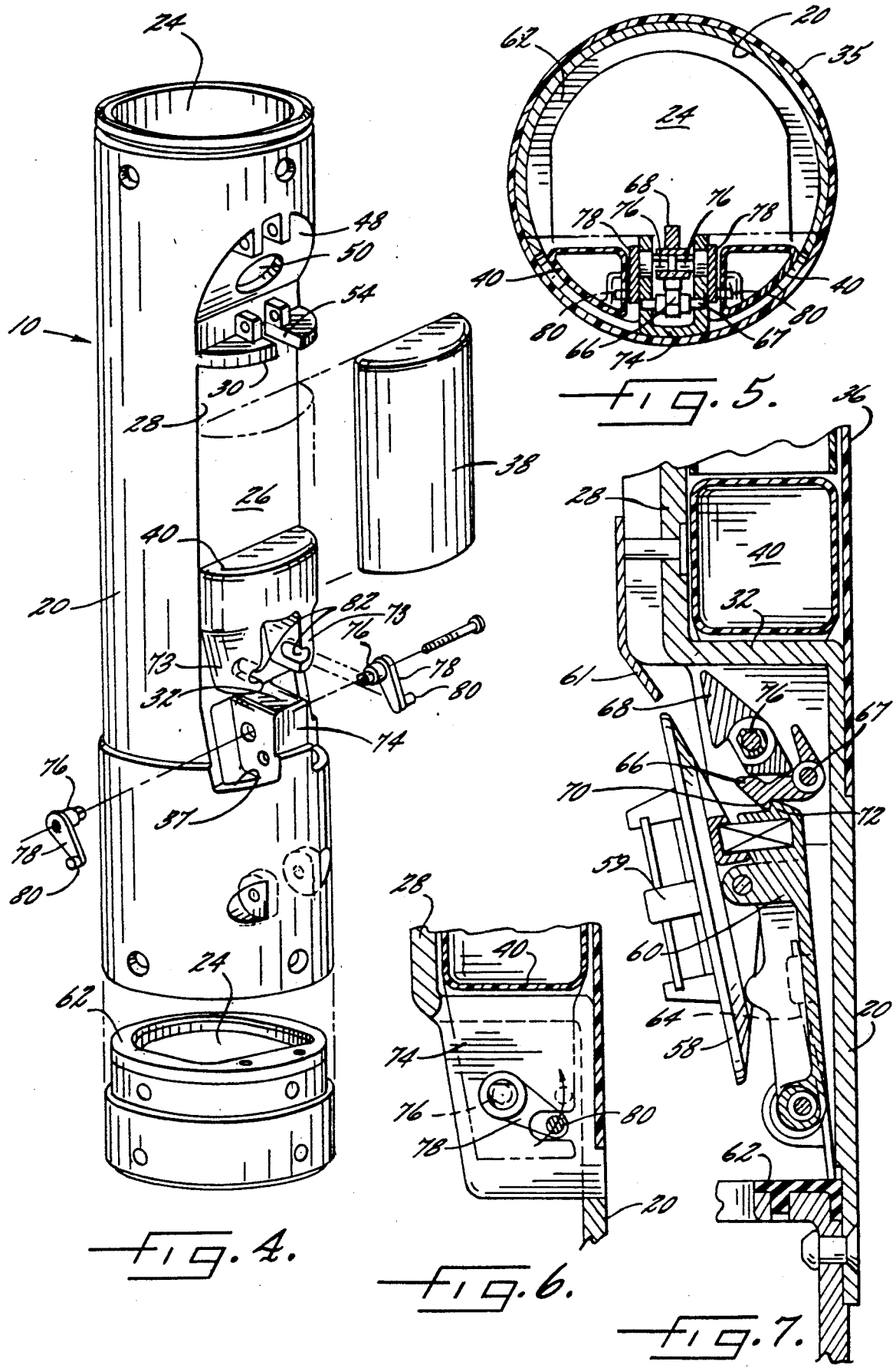

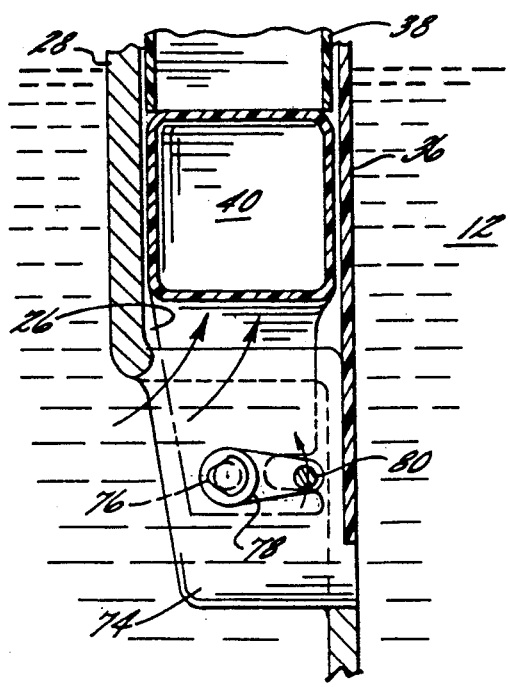
fig. 8.
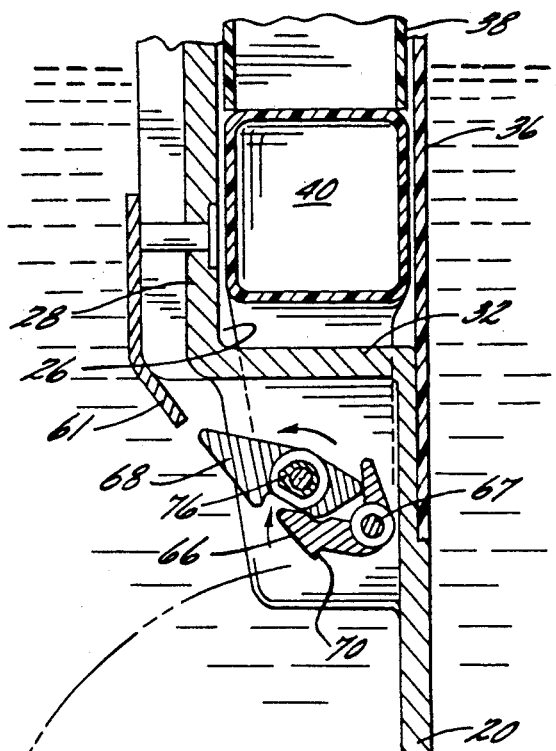
fig. 9.
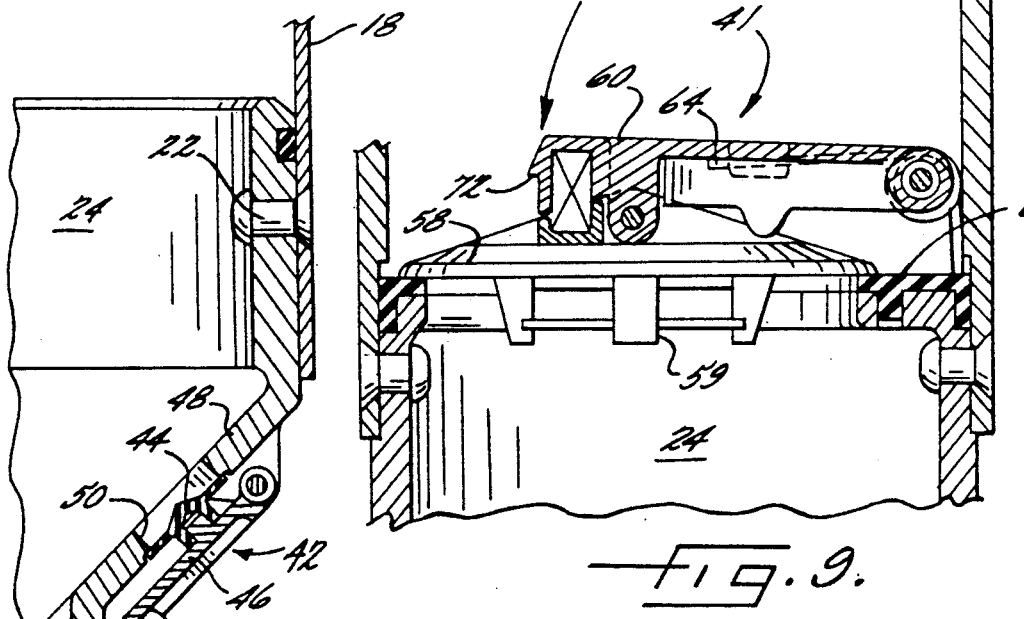
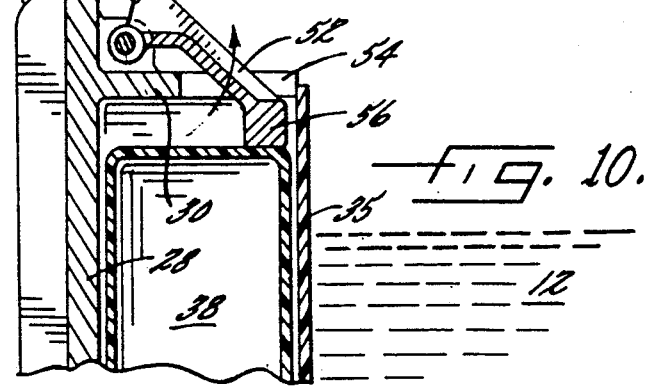
fig. 10.

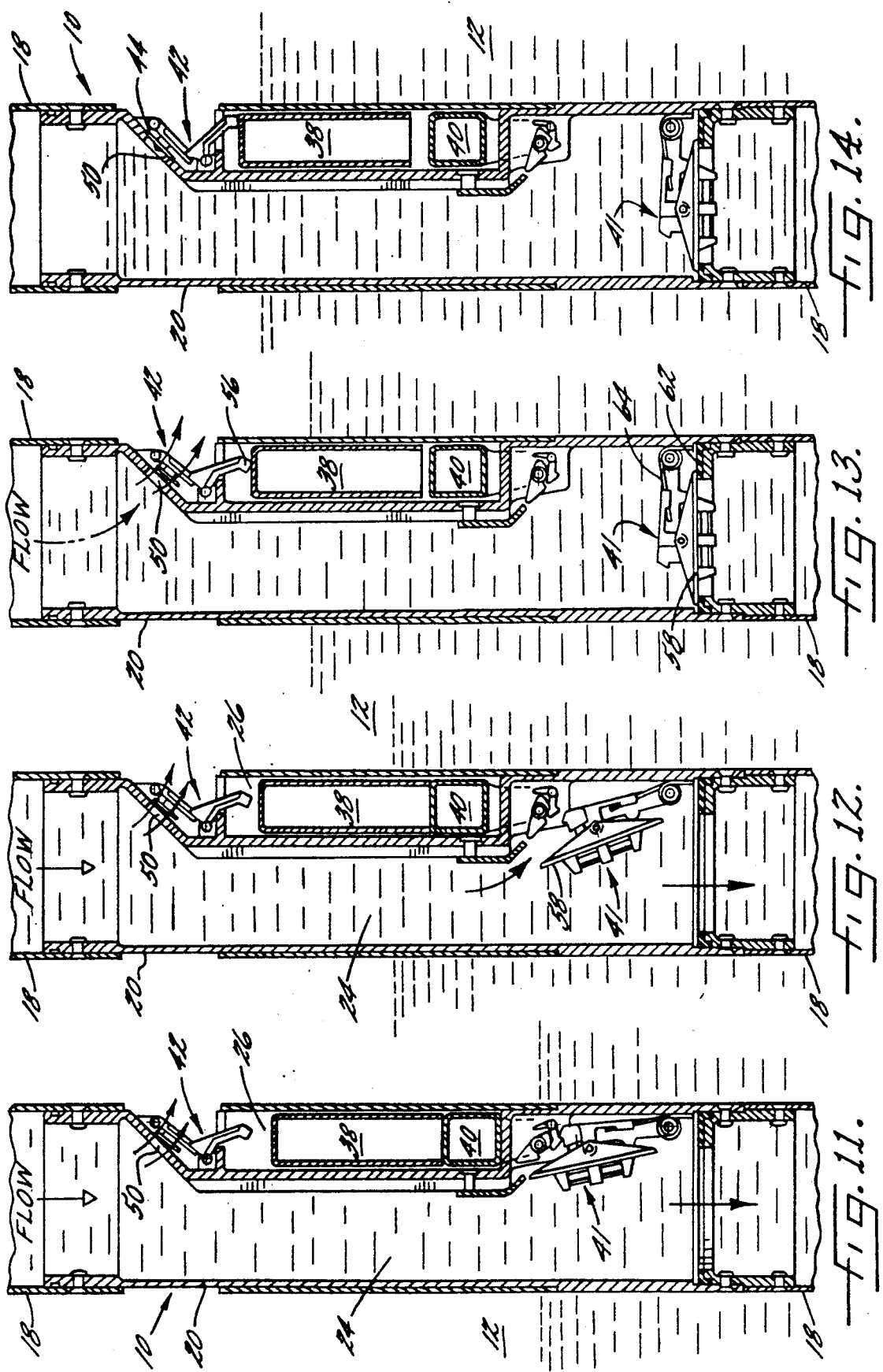

OVERFILL PREVENTION MECHANISM FOR STORAGE TANKS

BACKGROUND OF THE INVENTION

This invention relates to mechanisms for preventing overfilling of liquid storage tanks, particularly but not necessarily exclusively underground tanks of the type commonly used by automobile service stations and similar establishments for the storage of gasoline and similar liquid products.

Overfilling storage tanks with gasoline or similar liquids may have detrimental ecological and other consequences. In recognition of this fact, it has been previously proposed to provide mechanisms for automatically stopping or at least retarding the introduction of additional liquid into a tank after it has been filled to a preselected extent, which may be and now normally is dictated by governmental regulations, of its maximum capacity. In order to prevent tampering and/or damage from accidental impacts or the like, the overfill mechanism preferably is located entirely within the tank, in series with the "drop tube" or other conventional piping through which the liquid is introduced into the tank. Retrofit installation of an overfill mechanism located within the tank requires that the mechanism be sufficiently small, especially in its transverse dimension, as to be capable of passage through the tank's inlet opening and the fill pipe normally associated therewith. Many of the prior overfill prevention mechanisms include at least one float that projects laterally from the main body of the mechanism and undergoes arcuate pivotal movement in response to changes in the liquid level within the tank. Mechanisms having float and associated linkage components permanently projecting laterally from the housing of the mechanism cannot be installed readily, if at all, within existing tanks since they will not pass through the tank's inlet opening and/or associated piping. Even those mechanisms having float and linkage components that deploy outwardly from the housing only after passage into the tank will not function properly, if at all, when a side wall or baffle of the tank intersects and obstructs the intended path of pivotal movement of the float. Additionally, and in all cases, the use of long interconnecting linkages between the floats and the components connected thereto significantly increases the cost of the overfill mechanisms, and the risk of component malfunction.

Another undesirable feature of many overfill mechanisms is that they have bleed ports which permit the introduction, albeit at a slow rate, of an unlimited amount of additional liquid into a tank following closure of the main control valve of the mechanism.

SUMMARY OF THE INVENTION

The present invention provides an improved overfill prevention mechanism that is of highly compact, durable and economical construction, and that can be installed with facility within existing underground gasoline storage tanks, on a retrofit basis, as well as within new storage tanks. The mechanism includes a tubular housing that is connected in series with the "drop tube" or other pipe through which liquid is introduced into the tank. A liquid flow passageway extends longitudinally through the housing, and communicates with the drop tube. A normally open main valve and a normally open bleed valve are associated with the fluid passageway at spaced locations along its length. Closure of the main valve interrupts the primary flow of liquid through the passageway, and occurs when the liquid level within the tank reaches a preselected first elevation. Closure of the bleed valve, which occurs when the liquid level reaches a preselected second, higher elevation, prevents any further liquid from entering the tank. Operation of the valve assemblies is controlled in significant part by float means disposed within and movable longitudinally of a float chamber extending longitudinally of the housing in laterally spaced substantially parallel relationship to the flow passageway. The float means preferably consists of superimposed float members which are movable longitudinally of the float chamber in unison with each at certain times during operation of the mechanism, and are movable relative to each other at times. Movement of one of the floats triggers closure of the main valve assembly when the liquid level within the tank reaches the preselected first elevation. Movement of the other float brings it from a position distal from the bleed valve assembly to a position wherein the float abuts and closes such assembly, when the liquid level within the tank reaches the aforesaid second elevation.

DESCRIPTION OF THE DRAWINGS

Other features of the invention will be apparent from the following description of an illustrative embodiment thereof, which should be read in conjunction with the accompanying drawings, in which:

FIG. 4 is a partially exploded perspective view showing some of the float and adjacent components of the mechanism;

FIG. 5 is a horizontal sectional view taken substantially along the line and looking in the direction of the arrows 5—5 of FIG. 3;

FIG. 6 is a fragmentary side elevational view, some components being shown in vertical section, taken substantially along the line and looking in the direction of the arrows 6—6 of FIG. 3;

FIG. 7 is a view primarily in vertical section taken approximately along the line 7—7 of FIG. 3 showing the main valve assembly and adjacent components of the mechanism;

FIG. 8 is a view similar to FIG. 6 but showing the float and linkage components in positions occupied by them when the floats are displaced upwardly;

FIG. 9 is a view similar to FIG. 7 but showing components associated with the main valve assembly of the mechanism in the positions they occupy during closure of the valve assembly;

FIG. 10 is a view similar to that shown in the upper portion of FIG. 2 but showing float and bleed valve components in the positions they occupy upon closure of the bleed valve assembly; and FIGS. 11, 12, 13, and 14 are sequential schematic views showing changes occurring in the positions of components of the mechanism, in response to changes in the elevation of the liquid level.

DESCRIPTION OF THE PREFERRED EMBODIMENT

Figure 1:
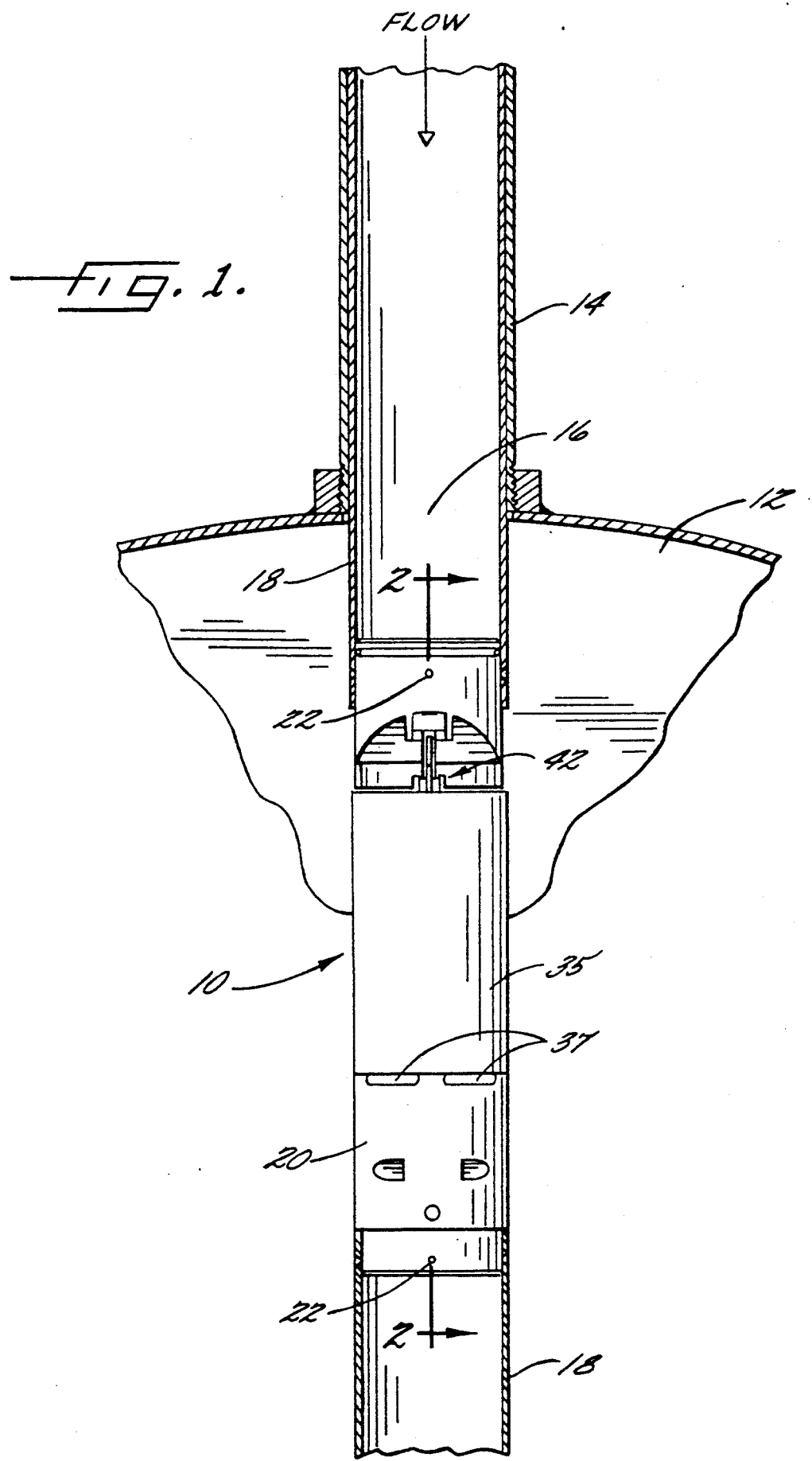
FIG. 1 is a partially schematic fragmentary view of a portion of a liquid storage tank containing an overfill mechanism in accordance with the invention.

The numeral 10 in FIG. 1 designates an overfill prevention mechanism that is located within the upper portion of a tank 12, which may be an underground tank such as is commonly used by gasoline service stations for storage of gasoline and similar liquids. Such a tank customarily and illustratively has a fill pipe 14 extending upwardly from an inlet opening 16. A removable "drop tube" 18 extends through fill pipe 14 and opening 16, and normally terminates adjacent the bottom of tank 12. As is well known to those skilled in the art, gasoline or other liquid would normally be introduced into tank 12, when required, by a tanker truck having a flexible hose communicating via a suitable coupling or fitting (all not shown) with fill pipe 14 and drop tube 18.

The mechanism 10 for preventing overfilling of tank 12 is connected in series with drop tube 18 at a preselected elevation within tank 10. The selected elevation is dependent upon the maximum height which the liquid level within the tank is to reach during each filling operation.

Figure 2:
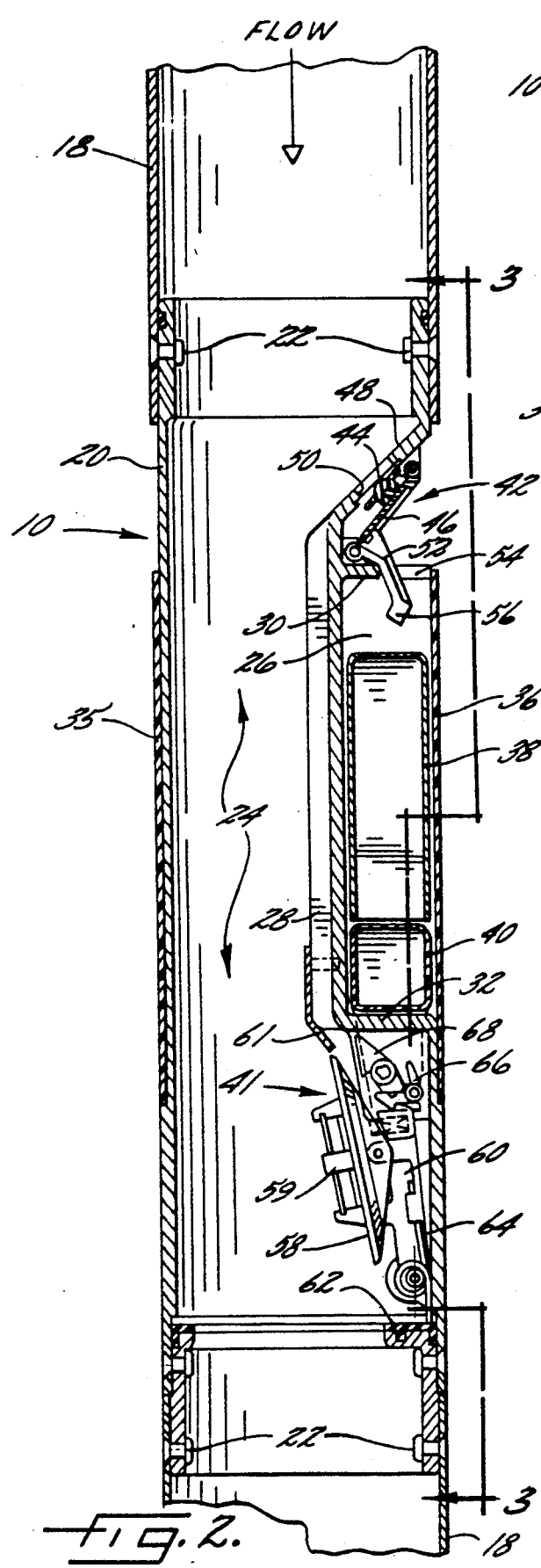
FIG. 2 is an enlarged sectional view, taken approximately along the line 2—2 of FIG. 1, of the mechanism and of fragmentary portions of tank piping to which it is connected.
Figure 3:
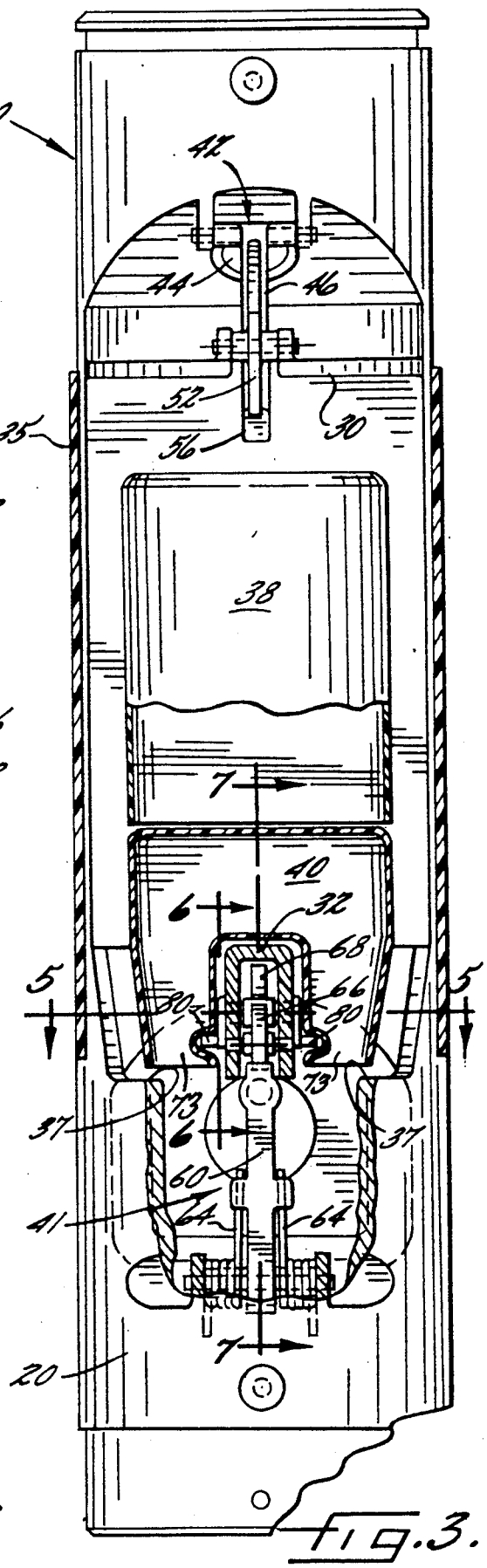
FIG. 3 is a view partially in front elevation and partially in vertical section taken substantially along the line 3—3 through the mechanism of FIG. 2.

Referring now also to other figures of the drawings, mechanism 10 includes an elongate tubular, housing 20, preferably of cylindrical shape. Housing 20 has a diameter approximately the same as that of drop tube 18, and is secured to and in axial alignment with the drop tube by rivets 22 or other suitable fasteners. A liquid flow passageway 24 extends the entire length of housing 20 and communicates at its opposite ends with thereto adjacent sections of drop tube 18. A main valve assembly 41 and a bleed valve assembly 42 are respectively located adjacent the lower end portion and the upper end portion of passageway 24. In the normally open positions thereof show in FIGS. 2 and 3, assembly 41 permits large-volume axial flow of liquid from the lower end of passageway 24, and assembly 42 permits a much smaller lateral flow of liquid from the upper portion of the passageway. When assemblies 41 and 42 occupy their closed positions respectively shown in FIGS. 9 and 10, no significant amount of liquid passes into tank 12 from mechanism 10.

Housing 20 also has, intermediate its length, a float chamber 26 that extends in laterally adjacent, generally parallel relationship to flow passageway 24. Chamber 26 has horizontally extending top and bottom walls 30, 32, respectively, and a flat, vertically extending rear wall 28 that separates the chamber from, and is also a wall of, flow passageway 24. The front wall 36 of chamber 26 is defined by the thereto adjacent portion of the curved outer periphery of a sleeve-like member 35 that encircles the main body of housing 20 and constitutes part of its outer wall. Sleeve 35 may be formed of metal, or may instead be made of durable plastic, as shown. Flow ports 37, best shown in FIG. 1, are located adjacent lower edge of member 35 and the bottom of float chamber 26. The ports permit fluid flow between the interior of the chamber 26 and the interior of tank 12.

Float means, preferably and illustratively comprised of an upper float 38 and a lower float 40 are disposed within float chamber 26 and are constrained thereby for linear movement, at times in unison with each other and at other times relative to each other, longitudinally of the chamber and substantially parallel to passageway 24 and the central axis of housing 20. As viewed in top plan, the floats have a segmental shape complementary to that of the cross-sectional shape of chamber 26. In order to reduce their mass and simplify their construction, both floats may be and illustratively are open at their lower ends.

Floats 38, 40 constitute part of control means for controlling operation of valve assemblies 41 and 42. Move specifically, upper float 38 forms part of the means for controlling operation of the bleed valve assembly 42 located adjacent the upper, inlet end of passageway 24. Assembly 42 includes a disc-shaped valve element 44 affixed to a rigid link 46 pivotally mounted upon an inclined wall 48 of housing 20. Wall 48 projects angularly outwardly above top wall 30 of float chamber 26, and contains a bleed port 50. Link 46 and valve element 44 are biased by gravity to their positions shown in FIG. 2. Valve element 44 is then spaced sufficiently from port 50 as to permit a relatively small "bleed" flow of liquid from passageway 24 through the port and into tank 12. In addition to float 38 and link 46, the control means of valve assembly 42 includes a link 52 pivotally mounted upon float chamber top wall 30. The inner end portion of link 52 underlies and engages the outer end portion of link 46. The outer end portion of link 52 projects into float chamber 26 through an opening 54 within the chamber's top wall 30. Link 52 normally occupies and is biased by gravity to its position shown in FIG. 2. Upward buoyant movement of float 38 within chamber 26 effects engagement of the float's top surface with a pad 56 upon the outer end of link 52. As shown in FIG. 10, further upward movement of float 38 then displaces link 52 to a position wherein it pivots link 46 upwardly to an extent seating valve element 44 against bleed port 50. This prevents significant flow through port 50 until such time as float 38 descends enough to allow gravity-induced return of links 46, 52 to their FIG. 2 positions.

Lower float 40 is part of the means for controlling operation of main valve assembly 41. Such assembly includes a valve plate member 58 having a spring-loaded pressure-relief valve 59 within its central portion. Valve plate member 58 is pivotally mounted upon a pivotally movable lever arm 60 for movement between an upwardly extending first position, shown in FIG. 7, and a generally horizontally extending second position shown in FIG. 9. In its first position valve member 58 is adjacent a flow directing vane 61, and permits substantially free flow of liquid from the lower end of passageway 24. In its second position (FIG. 9) member 58 engages a seat 62 within the lower portion of passageway 24. It then prevents flow of fluid from the lower end, of the passageway except for insignificant flow such as that which would ensue upon temporary opening of pressure relief valve 59 in response to a downwardly directed pressure pulse upon the valve.

Valve member 58 and its support arm 60 are biased to their first, FIG. 7 positions by a torsion spring 64 engaging arm 60. During filling of tank 12 valve plate 58 and arm 60 are also biased in the opposite direction, toward their FIG. 9 position, by the force then imposed upon the upper (rightward, as viewed in FIGS. 2 and 7) side of valve plate 58 by the liquid adjacent to and upstream of valve assembly 41. When the "head" of such liquid is large, the force of it is sufficiently greater than the force of spring 64 as to drive valve plate 58 and arm 60 to their FIG. 9 positions, when they are free to undergo such movement. However, movement of plate member 58 and arm 60 to their FIG. 9 positions is prevented except at desired times, by pivotally movable latch and catch member 66, 68 that releasably secure members 58 and 60 in their FIG. 7 positions. In their engaged position shown in FIG. 7, a downwardly projecting shoulder 70 upon the undersurface of the generally horizontally extending main body of latch 66 engages an upstanding shoulder 72 upon the free end portion of the outer end of valve support arm 60. The adjacent undersurface of catch member 68 then extends in generally parallel, abutting relationship to the notched upper surface of the main body of latch 66. This prevents latch 66 from undergoing pivotal movement sufficient to terminate the abutting relationship between shoulders 70, 72, which are not perfectly parallel. Such disengagement would otherwise automatically occur when the force exerted upon valve plate 58 and arm 60 by upstream liquid exceeds the counterforce imposed upon such members by torsion spring 64. FIG. 9 shows latch 66 and catch 68 in their disengaged positions. Pivotal movement of catch 68 has so displaced its undersurface relative to the notched upper surface of the main body portion of latch 66 as to permit the slight amount of pivotal latch movement necessary for the shoulder 72 upon arm 60 to upwardly displace catch shoulder 70 and move out of engagement therewith, and to thus allow the upstream fluid to move valve plate 58 and arm 60 to their FIG. 9 positions. At such time as the force imposed upon the aforesaid components by the upstream fluid becomes less than the force imposed by torsion spring 64, as a result of a reduction in the quantity of the upstream liquid, spring 64 will again return valve plate 58 and arm 60 to their FIG. 7 positions.

The lower float 40 within float chamber 26 causes catch 68 to undergo the pivotal movement necessary for it and latch 66 to function in the above-described manner. The lower portion of float 40 is bifurcated so as to possess depending legs 73 that straddle a hollow pillar-like housing portion 74 extending upwardly from the bottom wall of chamber 26. A pin 76, integral with catch 68 and about whose central axis the catch pivots, extends laterally through a suitable bore of pillar 74. Arm 78 fixedly connected to the opposite ends of latch pin 76 extend generally parallel to the opposite sides of pillar 74. Studs 80 upon the ends of arms 78 project into slots 82 within the inner faces the depending legs 73 of float 40. By virtue of the foregoing connection therebetween, upward movement of float 40 from the bottom wall of float chamber 26 pivots arms 78 upwardly, as indicated in FIG. 6. This in turn pivots catch 68 from its position of FIG. 7 to its position of FIG. 9, freeing latch 66 for the slight upward pivotal movement necessary for release of arm 60 and valve plate 58 of valve assembly 41. When the liquid level within tank 12 descends and sufficiently reduces the "head" of the upstream liquid, torsion spring 64 returns arm 60 and valve plate 58 to their FIG. 7 position and downward movement of float 40 back to the bottom of float chamber 26 causes pivotal movement of catch 68 back to its original position. The reset components of assembly 41 then again are disposed in their positions of FIG. 7. Excessive rotation of latch 66 about the axis of its pin 76, which also extends through pillar 74, is prevented by the latch's engagement with confronting portions of catch 68 at all times.

FIGS. 11-14 illustrate the positions sequentially occupied by components of mechanism 10 during a typical tank-filling operation. In FIG. 11, the liquid level is below that of float chamber 26. Lower float 40 rests upon the bottom wall of the chamber, and upper float 38 rests upon the lower float. Valve assemblies 41 and 42 both occupy their "open" positions. Liquid entering mechanism 10 is discharged into tank 12 primarily through the lower outlet end of fluid passageway 24, and secondarily through the bleed port of valve assembly 42. In FIG. 12, the liquid level within the tank has risen to the preselected elevation at which the primary flow of fluid through the lower end of mechanism 10 should be terminated. The upper and lower floats have floated upwardly sufficiently as to pivot the catch of main valve assembly 41 to a position permitting disengagement of the latch and pivotal movement of the main valve plate member toward its seated position. In FIG. 13, the valve plate of the main valve assembly has been moved by the force of the upstream liquid to its fully seated position. Passage of liquid from the lower end of the fluid passageway of the mechanism is halted. Secondary flow of liquid through the bleed port of the bleed valve assembly permits drainage of the hose of the tanker truck (not shown), via which the liquid is introduced into the overfill mechanism, following closure of the truck's discharge valve. In FIG. 14, the liquid level has risen to a still higher elevation, as might happen due to an excess of the liquid in the hose being drained, or for some other reason. The higher level of the liquid raises the upper float sufficiently as to cause it to close the bleed port of bleed valve assembly 42 so that no more liquid passes from the overfill mechanism into the tank. When the liquid level within the tank drops sufficiently below its elevation indicated in either FIG. 13 or FIG. 14, due to withdrawal of liquid from the tank for purposes of sale or the like, the movable components of the overfill mechanism all return automatically to their positions of FIG. 11, in readiness for commencement of a new cycle of operation when required.

While a preferred embodiment of the invention has been specifically shown and described, this was for purposes of illustration only, and not for purposes of limitation, the scope of the invention being in accordance with the following claims.

I claim:

1. An overfill prevention mechanism adapted to be mounted within a liquid storage tank in series with piping through which liquid is introduced into the tank, comprising:

an elongate housing having a liquid flow passageway extending longitudinally thereof, a liquid inlet communicating with said passageway adjacent one end thereof, a primary liquid outlet communicating with said passageway adjacent the other end thereof, and a liquid bleed port communicating with said passageway intermediate its length;

a main valve assembly and a bleed valve assembly carried by said housing, each of said valve assemblies having an open condition and a closed condition, said main valve assembly when in a closed condition blocking significant flow of liquid from said passageway through said outlet, said bleed valve assembly including said bleed port and when in a closed condition blocking significant flow of liquid from said passageway through said bleed port;

an elongate float chamber extending longitudinally of said housing in laterally adjacent relationship to said passageway;

float means disposed within said float chamber and being constrained thereby for movement along a substantially linear path of travel; and valve control means, including said float means, for controlling operation of said valve assemblies.

2. A mechanism as in claim 1, wherein said float means includes first and second superimposed float members.

3. A mechanism as in claim 1, wherein said float means includes first and second float members movable along said path of travel at first times in unison with each other and at other times relative to each other.

4. A mechanism as in claim 1, wherein said control means for said bleed valve assembly includes a linkage, and said float means includes first and second float members, one of said float members being movable along said path of travel between a position distal from and out of engagement with said linkage, to a position wherein said one of said float members engages and displaces said linkage and thereby causes said bleed valve assembly to assume said closed condition thereof.

5. A mechanism as in claim 1, wherein said main valve assembly includes a valve seat, a valve plate, a pivotally movable arm mounting said valve plate for movement from an open position distal from said valve seat to a closed position upon said valve seat, an engageable and disengageable latch member for when engaged maintaining said valve plate in said first position thereof, a catch member engaging said latch member and movable between a first position wherein said catch member prevents disengagement of said latch member, and a second position wherein said catch member permits disengagement of said latch member; said float means including two float members, movement of one of said float members in one direction along said path of travel moving said catch from said first position to said second position thereof, and movement of said one of said float members along said path of travel in the opposite direction moving said catch member from said second position to said first position thereof.

6. A mechanism as in claim 5, wherein said catch member has a pivot pin fixedly connected thereto, arms connected to and extending substantially radially from opposite ends of said pivot pin, and stud elements extending from the outer ends of said arms and connected to said one of said float members.

7. A mechanism as in claim 5, and further including a spring biasing said valve plate towards said open position thereof, said valve plate being biased toward said closed position thereof by the force of liquid adjacent thereto and upstream therefrom.

8. A mechanism as in claim 7, and further including a pressure relief valve within said valve plate.

9. A mechanism as in claim 8, wherein said float chamber has a port permitting passage of liquid into and out of said chamber.

10. A mechanism as in claim 9, wherein said port is adjacent the bottom of said chamber.

11. An overfill prevention mechanism adapted to be mounted within a liquid storage tank in series with piping through which liquid is introduced into the tank, comprising:

a housing having a passageway extending therethrough and having a liquid inlet and a liquid outlet communicating with opposite ends thereof, and a bleed port intermediate the length of said passageway;

a main valve assembly and a bleed valve assembly each having an open condition and a closed condition, said main valve assembly when in its closed condition blocking significant flow of fluid from said outlet of said passageway, said bleed valve assembly including said bleed port and when in said closed condition blocking significant flow of liquid from said passageway through said bleed port;

valve assembly control means including a first float member for triggering closure of said main valve assembly when the liquid level adjacent said housing reaches a first preselected elevation, and a second float member for effecting closure of said bleed valve assembly if and when said liquid level reaches a preselected second elevation greater than said first elevation.

12. A mechanism as in claim 11, wherein said float members are movable along a substantially linear path of travel located in laterally spaced adjacent relationship to said passageway.

13. A mechanism as in claim 11, wherein said float members are movable generally parallel to said passageway.

14. A mechanism as in claim 13, wherein said float members are of segmental arcuate shape, and are open bottomed.

15. An overfill prevention mechanism adapted to be mounted within a liquid storage tank in series with piping through which liquid is introduced into the tank, comprising:

an elongate housing having a liquid flow passageway extending longitudinally thereof, a liquid inlet communicating with said passageway adjacent one end thereof, a primary liquid outlet communicating with said passageway adjacent the other end thereof, and a liquid bleed port communicating with said passageway intermediate its length;

a main valve assembly and a bleed valve assembly carried by said housing, each of said valve assemblies having an open condition and a closed condition, said main valve assembly when in a closed condition blocking significant flow of liquid from said passageway through said outlet, said bleed valve assembly including said bleed port and when in a closed condition blocking significant flow of liquid from said passageway through said bleed port;

an elongate float chamber within said housing;

first and second float members located within said housing for movement longitudinally thereof at times in unison with each other and at other times relative to each other; and valve control means for controlling the operation of said valve assemblies, said valve control means including said float members.

16. A mechanism as in claim 15, wherein said float members are in superimposed relationship.

* * * * *